United States Patent [19]

Cajthaml, Jr. et al.

[11] Patent Number: 4,598,859
[45] Date of Patent: Jul. 8, 1986

[54] EXHAUSTING GAS FROM A METAL ASSEMBLY

[75] Inventors: Peter Cajthaml, Jr., Wilmington, N.C.; James R. Hunter, McMurray, Pa.

[73] Assignee: Pfizer Inc., New York, N.Y.

[21] Appl. No.: 699,767

[22] Filed: Feb. 8, 1985

[51] Int. Cl.[4] .............................................. B23K 31/02
[52] U.S. Cl. ................................... 228/185; 228/203; 228/235; 228/218; 228/220
[58] Field of Search ............... 228/185, 186, 203, 234, 228/235, 232, 218–221, 238, 242, 243

[56] References Cited

U.S. PATENT DOCUMENTS

| | | | |
|---|---|---|---|
| 2,018,725 | 10/1935 | Johnson et al. | 228/145 |
| 2,745,172 | 5/1956 | Townsend | 29/19 X |
| 2,758,368 | 8/1956 | Ulam | 228/186 |

Primary Examiner—Kuang Y. Lin
Attorney, Agent, or Firm—Charles J. Knuth; Peter C. Richardson; Gezina Holtrust

[57] ABSTRACT

Gases entrapped in a metal assembly are exhausted through a vent closed off by a metal or metal alloy which has a melting point below the temperature at which said assembly is hot rolled. The metal assembly is designed to bond dissimilar metals on hot rolling.

15 Claims, 2 Drawing Figures

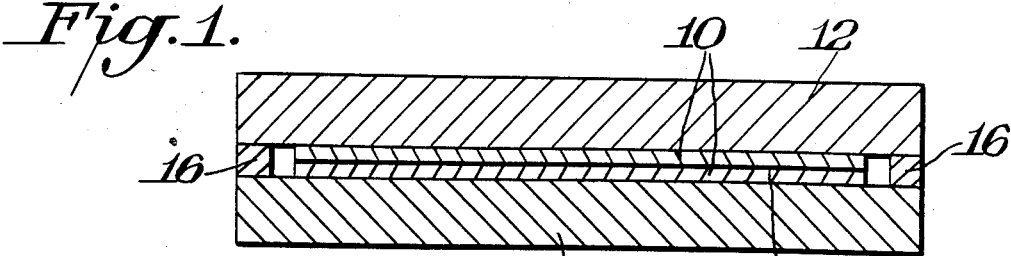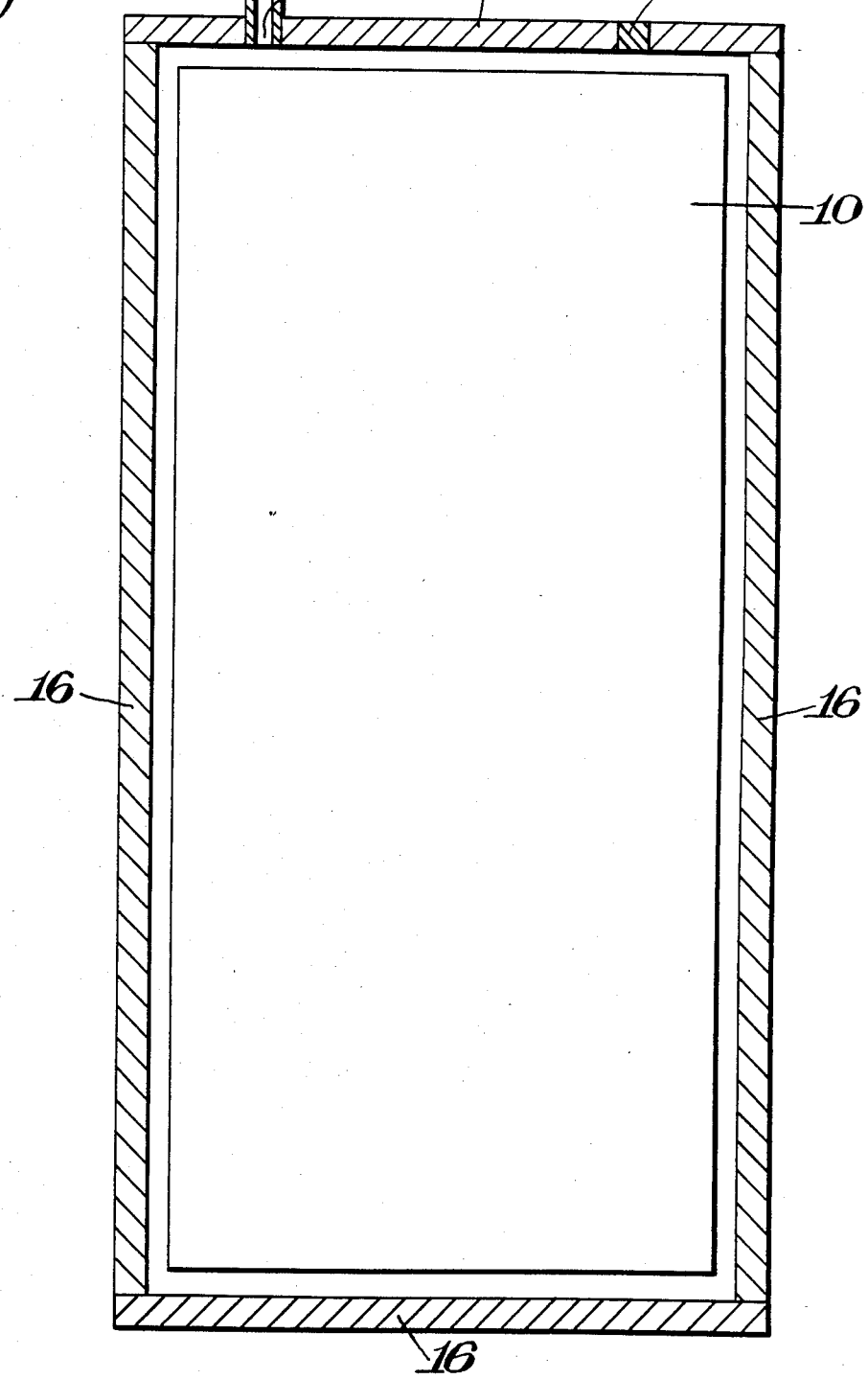

EXHAUSTING GAS FROM A METAL ASSEMBLY

BACKGROUND OF THE INVENTION

This invention relates to a metal assembly for bonding dissimilar metals by hot rolling, a method of bonding said dissimilar metals, and a method of forming said metal assembly.

Bonding of dissimilar metals such as nickel and carbon steel by hot rolling is known. U.S. Pat. Nos. 2,018,725 and 2,745,172 describe heating a metal assembly comprising an assembled slab of dissimilar metals before hot rolling. During heating of the assembly, the air and any other gases in the assembly expand and are allowed to escape through vents. U.S. Pat. No. 2,745,172 discloses filling of the vents with refractory material to prevent air from returning to the inside of the assembly. These patents do not deal with avoiding the problem of oxidation of the metal surfaces to be bonded by evacuation of the metal assembly.

Such evacuation by applying a vacuum to prevent the metals from being oxidized on heating is a later development and is for instance disclosed in U.S. Pat. No. 2,758,368. According to this evacuation method, air and any other gases are exhausted from dissimilar metals sealed from the outside atmosphere. After a substantial vacuum is produced, the evacuated assembly is sealed off to prevent access of any air. The sealed assembly is then heated and worked by pressing or rolling.

U.S. Pat. No. 2,758,368 does not disclose means for venting air remaining due to imperfect evacuation. It is known that conventional evacuated assemblies expand, sometimes to twice the original thickness, on heating before hot rolling. They often rupture during the initial stages in the rolling mill resulting in clad materials of poor quality and in yield loss.

It is an object of the invention to allow venting of trapped gases during the heating step before hot rolling.

It is a further object of the invention to reduce bonding failure in bonding dissimilar metals.

SUMMARY OF THE INVENTION

According to the invention, a metal assembly for bonding dissimilar metals by not rolling comprises a pack of at least a pair of superimposed plates of said dissimilar metals; metal sealing means located about and welded to said plates to provide a substantially gas-tight enclosure; and a vent extending through said sealing means from the inside to the outside thereof and comprising at least one venting hole closed off with a metal or metal alloy having a melting point below the temperature at which said metal assembly is hot rolled.

The invention is also concerned with a method for bonding dissimilar metals which comprises sealing an assembly of at least a pair of superimposed plates of dissimilar metals from the outside atmosphere; evacuating the air and any other gases from between the plates of dissimilar metals; sealing off the evacuated assembly to prevent access of gases to said plates; heating the sealed assembly; venting the heated assembly through a vent by melting of a metal or metal alloy closing off said vent during evacuation; and hot rolling the vented assembly.

Furthermore, the invention relates to a method of forming a metal assembly which comprises providing a pack of at least a pair of superimposed plates of dissimilar metals; welding said pack to a metal sealing means located about said plates to provide a substantially gas-tight enclosure; drilling a hole through said sealing means; inserting an evacuation tube in said hole; welding said tube in place; drilling a second hole through said sealing means; and closing said second hole with a metal or metal alloy having a melting point below the temperature at which the assembly is hot rolled.

It was found according to the invention that venting during the heating step before hot rolling substantially reduces bonding failure, when the venting is delayed just prior to hot rolling by closing off the vent by a metal or metal alloy which melts only at elevated temperatures although below the hot rolling temperature.

BRIEF DESCRIPTION OF THE DRAWINGS

FIG. 1 depicts a cross-sectional view of a metal assembly according to the invention.

FIG. 2 depicts a cross-sectional view along the length of a metal assembly according to the invention.

DETAILED DESCRIPTION OF THE INVENTION

The dissimilar metals used in the invention are any dissimilar metals bondable by hot rolling such as nickel and steel, stainless steel and carbon steel, mild steel and stainless steel, open hearth steel and nickel or nickel-chromium alloy, etc. The invention will be explained with reference to nickel clad carbon steel although any dissimilar metals may be used.

The metal assembly of the invention comprises a pack of one or more pairs of superimposed plates of dissimilar metals. Although one plate of nickel and one plate of steel may be used, usually the pack comprises two plates each of nickel and steel. In the latter case, two plates of nickel (10) are placed between two plates of steel (12). A separating compound (14) is placed in a layer between the nickel plates to prevent bonding of the nickel plates to each other. Any separating compound, e.g. an inert metal oxide such as chromium oxide or aluminum oxide, may be used.

The two nickel plates and the separating compound are welded together to keep the separating compound in place. A small gap, e.g. about 1 to 3 inches, is left in the weld to allow for escape of air during later process steps such as evacuation and heating. The welded nickel plates are placed between two steel plates. Before placing the steel plates on the nickel plates, generally, the attaching surfaces of the four metal plates are cleaned to aid the bonding during subsequent hot rolling.

In general, any metal sealing means may be used to provide an enclosure about the dissimilar metals which prevents any outside gas such as air from entering the pack of dissimilar metal plates. For instance, two plates of dissimilar metals may be welded together to form the gas-tight enclosure.

Conveniently, however, the above-described pack of two nickel plates and two steel plates is used whereby the two steel plates are larger than the nickel plates so that they extend beyond the edges of the nickel plates. Spacer bars (16) are placed between the extending parts of the steel plates around the entire perimeter of the nickel plates. The air-tight enclosure is completed by welding of the spacer bars to the steel plates.

One of the spacer bars has a hole (18) drilled through, either initially or after welding. An evacuation tube (20) is inserted in the hole and welded in place.

A second hole (22), the exhaust vent, is present in a spacer bar. This vent is closed with a metal or metal alloy having a melting point below the temperature at which the metal assembly is hot rolled. Conveniently, the hole is closed with a brazing alloy by brazing. The type of metal or metal alloy used depends on the type of dissimilar metals used and the temperature of hot rolling as discussed in more detail below.

After closing of the exhaust vent, the assembly is tested for air leaks by pressurizing e.g. to about 7–8 p.s.i.g. (0.48–0.54 atmospheres) with argon or another inert gas and applying a soap solution to all welds. When all welds are found to be satisfactory, air and any other gases such as the testing gas are evacuated from the assembly with a vacuum pump via the evacuation tube. Generally, evacuation to a pressure of less than about 8 millitorr is satisfactory. The evacuation tube is sealed after evacuation.

The evacuated assembly is charged into a furnace and heated. The heating causes the trapped gas inside the evacuated assembly to expand and the metal or metal alloy in the exhaust vent to melt. On continued heating, the combination of internal pressure and heat opens the vent and releases excess gas. The temperature at which the metal or metal alloy melts and thus the venting temperature is selected to be close to the rolling temperature of the metal assembly. Preferably, the vent remains closed during virtually the entire heating step to prevent any outside air and gases from entering the assembly. Generally, venting is at 1000° to 2100° F.

The temperature of hot rolling depends on the metals being bonded and on the hot rolling method used. Generally, hot rolling is at about 1300° to 2400° F., usually about 2000° to 2200° F. Suitable brazing alloys for closing the vent are aluminum-based and copper-based alloys such as brass. These alloys have been successfully used on hot rolling at 2100°–2200° F. such as hot rolling of nickel clad steel. Other brazing alloys which may be used arc for instance silver brazing alloys, copper-zinc brazing alloys, cobaltbase alloys and copper itself. Silver-brazing alloys and copper-zinc alloys are examples of filler metals used in torch brazing of low-carbon and low-alloy steels.

The following Examples illustrate the invention.

EXAMPLE 1

Two nickel plates of 56 by 118 inches and 0.25 inch thickness having a layer of separation compound chromium oxide between them were welded together leaving a small gap of 1 inch in the weld. Slabs of 58 by 120 inches carbon steel of 2 inch thickness were superimposed on the nickel plates extending inch beyond the edges thereof.

Four spacer bars were placed around the four sides of the inner nickel pack between the carbon steel slabs. The bars were welded to the carbon steel slabs to ensure an airtight seal. An evacuation tube having a diameter of 0.5 inch was inserted through a hole in one end spacer bar and welded in place.

A second hole of 0.5 inch diameter in the end spacer bar was brazen closed with a bronze plug. The bronze plug was made of an alloy of 58% copper, 40% zinc and 2% other metals such as tin and iron, and impurities. The entire assembly was pressure tested for air leaks by pressurizing to 7.5 p.s.i.g. with argon and applying a soap solution to all welds. All welds were found to be airtight. Air was evacuated from the assembly with a vacuum pump to a vacuum of 8 millitorr and the evacuation tube was sealed.

The assembly was heated to 2100° F. and then rolled at 2100° F. in a U.S. Steel 160 inch plate mill. No cladding failure was encountered.

EXAMPLE 2

The steps in Example 1 were repeated using brass as the brazing alloy. On heating to 2100° F. and hot rolling at 2100° F., a nickel clad steel slab was obtained.

EXAMPLE 3

Example 1 was repeated except that an exhaust tube having a diameter of 0.5 inch was inserted through the second hole extending into the nickel pack and aluminum was used as the brazing alloy instead of bronze. On heating and subsequent hot rolling at 2100° F., a nickel clad steel was obtained having no cladding failure.

We claim:

1. A method for bonding dissimilar metals which comprises
    sealing an assembly of at least a pair of superimposed plates of dissimilar metals from the outside atmosphere;
    evacuating the air and any other gases from between the plates of dissimilar metals;
    sealing off the evacuated assembly to prevent access of gases to said plates;
    heating the sealed assembly;
    venting the heated assembly through a vent by melting of a metal or metal alloy closing off said vent during evacuation; and
    hot rolling the vented assembly.

2. A method as claimed in claim 1 wherein said venting is at a temperature ranging from 1000° to 2100° F.

3. A method as claimed in claim 1 wherein said metal or metal alloy is selected from the group consisting of aluminum alloy and copper alloy.

4. A method as claimed in claim 1 wherein said dissimilar metals are nickel and steel.

5. A method as claimed in claim 1 wherein said assembly comprises two plates of a first metal and therebetween two plates of a second metal, said second metal plates being separated by a separating compound.

6. A method as claimed in claim 5 wherein said first metal plates extend beyond the edges of said second metal plates.

7. A method as claimed in claim 6 wherein spacer bars are placed between the extending parts of said first metal plates and around said second metal plates.

8. A method as claimed in claim 5 wherein said first metal is steel and said second metal is nickel.

9. A method as claimed in claim 7 wherein said separating compound is a metal oxide selected from the group consisting of aluminum oxide and chromium oxide.

10. A method of forming a metal assembly which comprises
    providing a pack of at least a pair of superimposed plates of dissimilar metals;
    welding said pack to a metal sealing means located about said plates to provide a substantially gas-tight enclosure;
    drilling a hole through said sealing means;
    inserting an evacuation tube in said hole;
    welding said tube in place;
    drilling a second hole through said sealing means; and
    closing said second hole with a metal or metal alloy having a melting point below the temperature at which the assembly is hot rolled.

11. A method as claimed in claim 10 wherein said pack comprises two plates of a first metal and therebetween two plates of a second metal, said second metal plates being separated by a separating compound.

12. A method as claimed in claim 21 wherein said second metal plates and said separating compound are welded together.

13. A method as claimed in claim 12 wherein said welding allows for a small gap to vent any air from said plates and separating compound.

14. A method as claimed in claim 11 wherein said second hole is closed by brazing with a brazing metal or alloy.

15. A method as claimed in claim 14 wherein said brazing alloy is selected from the group consisting of an aluminum alloy and a copper alloy.

* * * * *